May 1, 1951  B. W. KING  2,550,823
DRY DOCK

Filed Sept. 12, 1945  8 Sheets-Sheet 2

Fig. 2.

INVENTOR.
BERTELL W. KING
BY Bohlaber, Jacott & Montstream
ATTORNEYS

May 1, 1951  B. W. KING  2,550,823
DRY DOCK
Filed Sept. 12, 1945  8 Sheets-Sheet 3

INVENTOR.
BERTELL W. KING
BY
ATTORNEYS

May 1, 1951  B. W. KING  2,550,823
DRY DOCK
Filed Sept. 12, 1945  8 Sheets-Sheet 6

INVENTOR.
BERTELL W. KING
BY
ATTORNEYS

May 1, 1951      B. W. KING      2,550,823
DRY DOCK

Filed Sept. 12, 1945      8 Sheets-Sheet 7

INVENTOR.
BERTELL W. KING
BY
*Bohleber, Fassett & Montstream*
ATTORNEYS

Patented May 1, 1951

2,550,823

UNITED STATES PATENT OFFICE 2,550,823

DRY DOCK

Bertell W. King, Brooklyn, N. Y.

Application September 12, 1945, Serial No. 615,805

16 Claims. (Cl. 114—45)

The invention relates to a dry dock for raising ships, barges and the like out of the water so that the hull may be worked upon. The dry dock includes a floatable platform which has mechanism for stabilizing the platform or maintaining the same level and particularly to prevent the vessel and dry dock from rolling over sidewise. If the center of gravity of the vessel and dry dock are in vertical alignment, the forces needed to maintain equilibrium are small. If, however, the vessel or dry dock lists a little, the rolling movement or the forces tending to cause the vessel and dry dock to roll over increase rapidly as the list increases. By preventing the list or roll from being initiated, or going beyond that occasioned by play in the bearings and flexibility necessarily inherent in the structural elements, the rolling over of the dry dock and vessel can be prevented with the expenditure of relatively small resisting forces.

The dry dock is also constructed or compartmentized so that enough water to sink the same can be taken in thereby reducing the amount of water necessary to be pumped out thereafter in order to float the vessel and dry dock or to float the dry dock alone.

It is an object of the invention to construct a dry dock in which a dry dock levels itself irrespective of the location of the maximum weight supported by the dry dock.

Another object of the invention is to construct a dry dock which cannot list or pitch.

Another object of the invention is to construct a dry dock which levels itself but which is also compartmentized so that the buoyancy of the dry dock fore and aft may be varied in accordance with the difference in pressure indicated at different points upon the leveling mechanism.

A further object is to construct a compartmentized dry dock with leveling or stabilizing means with bearings having indicating means to show unbalanced conditions which can be equalized by varying the fore and aft buoyancy of the dry dock.

Another object of the invention is to construct a dry dock having a floatable or floating hull which hull carries a floatable platform having leveling mechanism or means for stabilizing the platform irrespective of the location of the weight of the vessel upon the dry dock.

A still further object is to construct a dry dock having a floatable platform which is mounted between supporting side means which may be floating so that the dry dock can be floated wherever needed or for a permanent installation.

Other objects of the invention will be more apparent from the following description taken in connection with the accompanying drawings which illustrate preferred embodiments of the invention in which:

Figure 1:
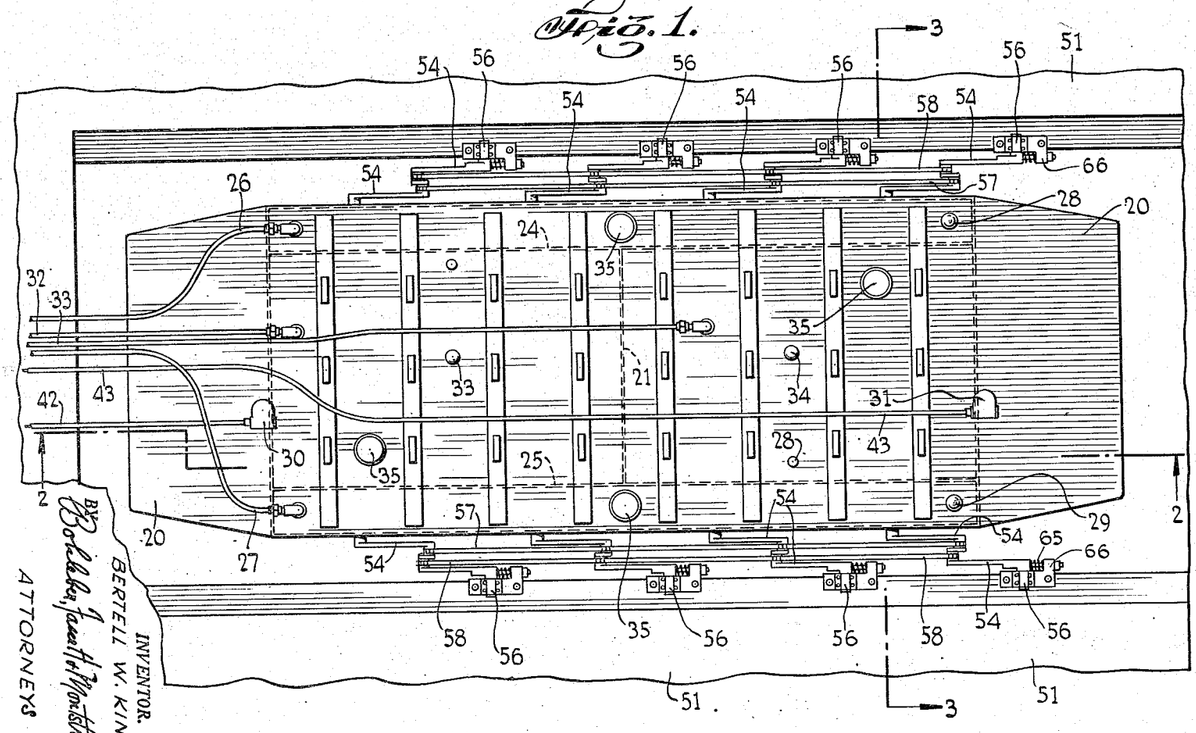
Figure 1 is a plan view of the floatable platform of the dry dock and the leveling mechanism therefor.
Figure 2:
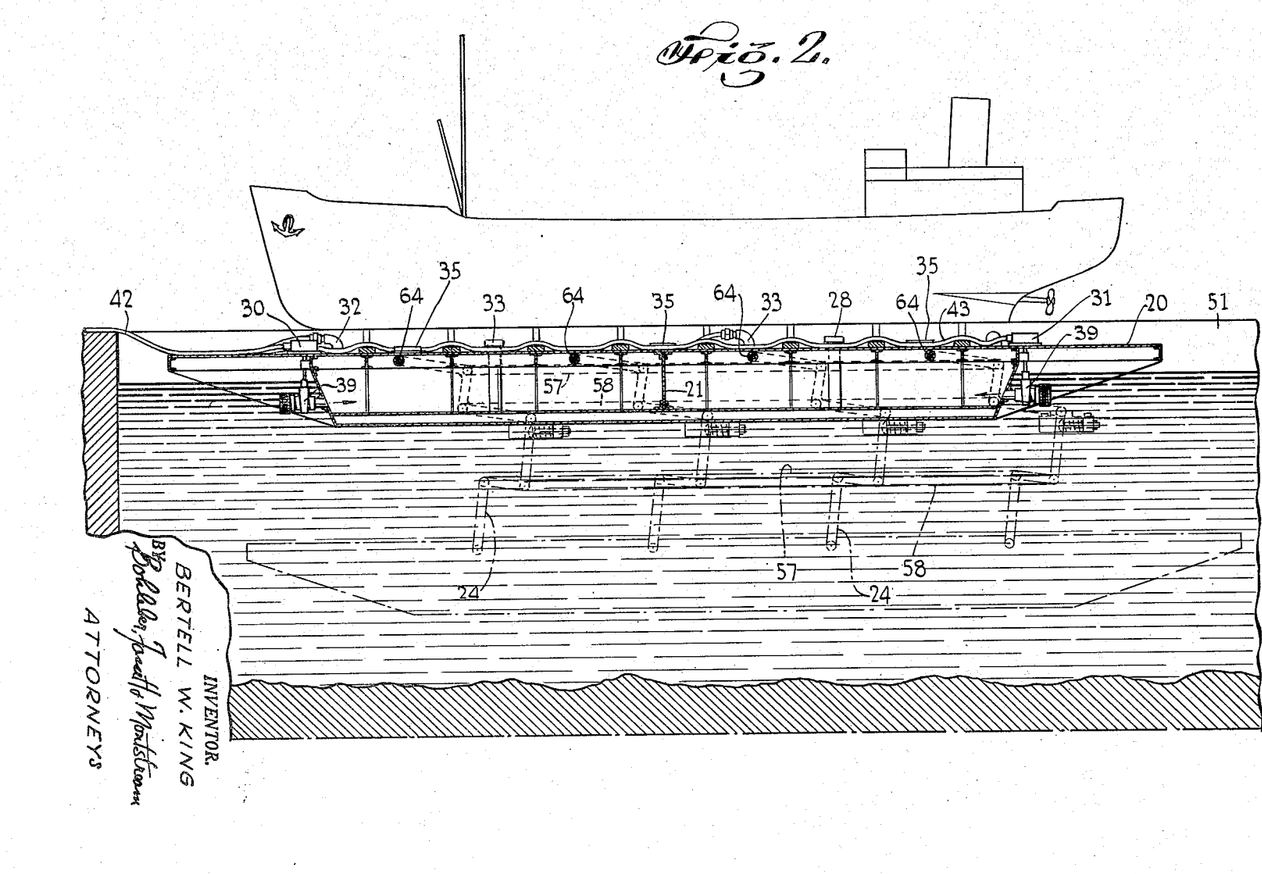
Figure 2 is a longitudinal section taken on line 2—2 of Figure 1 of the dry dock with a vessel floated thereby and the lower position of the floatable platform being shown in dot dash lines.

The dry dock includes a floatable platform 20 which preferably is divided into floodable compartments. A partition or bulkhead 21 may be located centrally of the platform to divide the same into a forward compartment 22 and an aft compartment. It is clear that any desired number of floodable compartments may be provided. Since the two ends of the platform are identical the terminology forward and aft are interchangeable.

The floatable platform may be provided with partition 24 extending fore and aft on one side of the platform and a like partition 25 is provided on the other side which partitions divide the platform into two side compartments extending the full length of or substantially the full length of the platform. These side chambers or compartments are not floodable. Although the platform illustrated has four compartments it is clear that a fewer number may be provided or a greater number as desired.

Normally the side compartments formed by the partitions 24 and 25 are not flooded and it is for this reason that no flooding valve is shown connected therewith. An airline 26 connects with one side compartment and an airline 27 connects with the other. Air may be forced into the side compartments to remove water through the stand pipes 28 and 29 respectively which water may have leaked into the compartments.

The center compartments have a flood valve 30 and 31 connected therewith respectively for opening the compartment to the flow of water thereinto. When the platform has sunk and it is desired to float the same the valves are closed whereupon air is forced into each compartment through the airlines 32 and 33 respectively. The water in each compartment is forced out through the stand pipe 33 and 34 respectively. Man holes 35 may be provided for entrance into each compartment.

Figure 15:
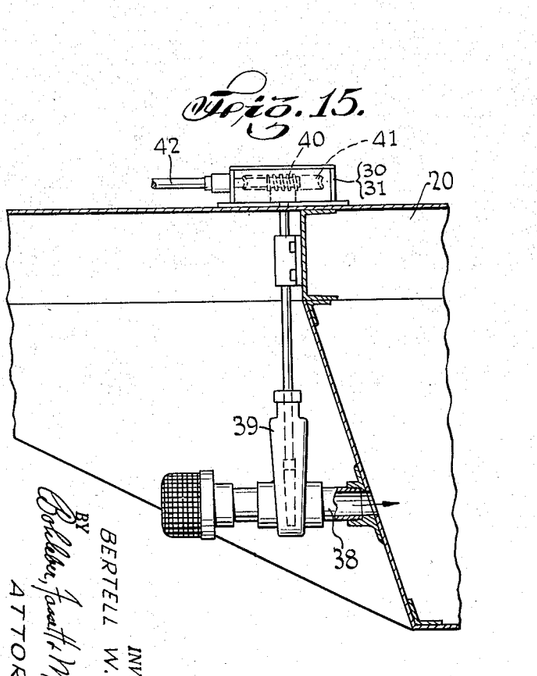
Figure 15 is a partial view of the floatable platform and the valve for flooding the same.

The flood valves 30 and 31 are shown in detail in Figure 15, which includes an inlet pipe 38 with a valve 39 which may be a gate valve. The gate valve may be raised and lowered through a worm 40 and worm wheel 41 which receives a threaded valve stem. The worm is connected by a flexible shaft 42 to a suitable operating mechanism carried on shore or above the water level. The flood valve 31 is operated by a flexible shaft connection 43 for opening and closing this flood valve so that each valve may be independently operated.

Figure 16:
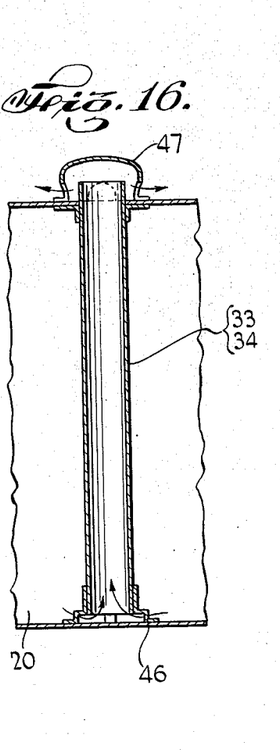
Figure 16 is a partial view in cross section showing the stand pipe through which the water is ejected from the floatable platform.

The stand pipes 33 and 34 are shown in Figure 16 which comprises a pipe supported above the bottom within the platform upon a bracket 46 so that water may pass into the pipe underneath the elevated bottom thereof. The upper end of the stand pipe is open upon the deck of the platform and is shown projecting above the upper deck thereof. It may be protected by a cap 47.

In order to sink the platform, the flood valves are opened whereupon the water flows into the floodable compartments through the inlet pipes 38. The air within the compartment escapes through the air lines 32 and 33. When the compartments are substantially full of water the platform has lost its buoyancy and it sings whereupon the vessel or barge may be run out over the platform. The flood valves are then closed through the flexible connections 42 and 43 and air is pumped or forced into the compartments through the air lines 32 and 33. As the air is forced into the compartments, the water is forced out through the stand pipes 33 and 34. As the water is forced out of the compartments the platform increases in buoyancy and lifts the platform and vessel until the latter is out of the water.

The volumetric capacity of the side compartments, that is the ones which are not flooded, shall have a total buoyancy of slightly less than the total weight of the whole platform structure. If the floodable compartments are filled with water the platform will sink. It is apparent then that the platform will exert a lifting force or start to rise when a relatively small amount of water is removed from the flooded compartments to overcome the slight difference between the lifting capacity of the non-floodable compartments and the actual weight of the structure. This arrangement results in requiring the removal of only a small amount of water from the flooded compartments in order to start floating or raising of the platform or the platform and vessel. In other words, the side compartments serve in effect as a counterbalance or counter-buoyancy for the weight of the floatable platform.

In the construction shown in Figure 1 the floatable platform is located between supporting side means which are permanent wooden or concrete side walls 50 and 51. This dry dock therefore has a fixed location and it is not of the floating or portable dry dock type.

Means are provided in order to level or stabilize the platform. This means levels the platform both fore and aft and also to port and starboard. The latter leveling is particularly important because when the platform has raised the vessel out of the water, a high center of gravity results so that it is relatively easy to roll the ordinary dry dock and the vessel sidewise. It does not take very much sidewise pitch or roll to overturn the dry dock and vessel thereupon. It is for this reason that the platform is provided with leveling or stabilizing means. So long as the center of gravity of the combined platform and vessel is located centrally of the dry dock it takes little force to maintain the dry dock and vessel against rolling. If a vessel and dry dock increases its off balance or list, the force that must be exerted in order to maintain it upright increases rapidly. If therefore the dry dock and vessel can be maintained on a horizontal plane or level the resisting force needed to maintain this position is relatively small.

Figure 4:
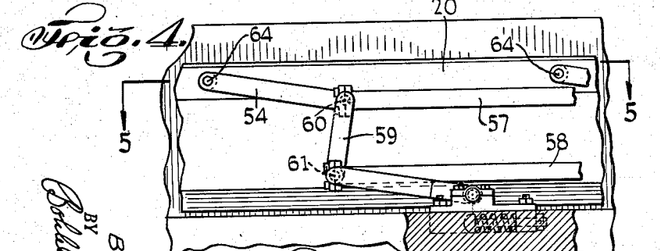
Figure 4 is a partial view of the leveling mechanism or means.
Figure 5:
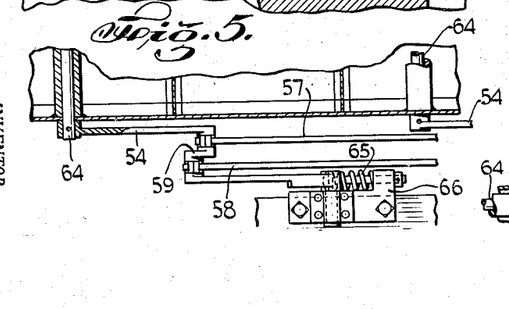
Figure 5 is a partial view of the leveling means with a part thereof in section taken on line 5—5 of Figure 4.
Figure 6:
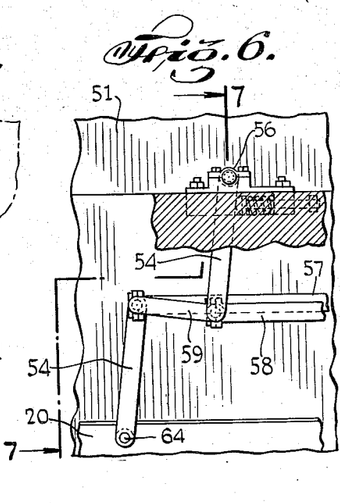
Figure 6 is a partial view of the leveling mechanism with the floatable platform in its lowermost position.
Figure 7:
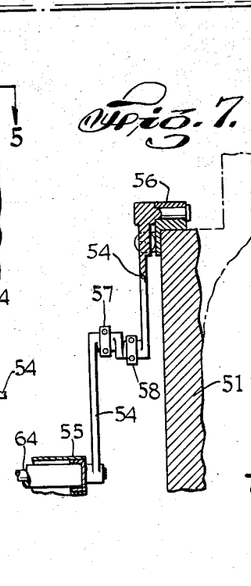
Figure 7 is a partial cross section of the leveling means taken on line 7—7 of Figure 6.

The leveling and stabilizing means for the platform include a plurality of arms 54 which are mounted at one end on the pivots or bearings 55 carried by the platform as shown in Figure 7. The other end of each arm is carried by pivots or bearings 56 carried by the supporting side means or walls 51. The arms are located at spaced intervals along each side of the platform. Four such arms are shown and it is clear that two or more arms may be provided, the number depending upon the length of the dry dock or platform. Means are provided to connect together the arms on one side of the platform which means is shown as a pair of bars 57 and 58. Preferably the arms have two spaced portions, at the ends thereof which may be and are shown in parallel relation, and a central portion 59 connecting the parallel portions together. A bearing 60 and 61 is provided at each end of the central portion, and each is vertical with respect to each other when the arms are in sidewise extending position or substantially horizontal as shown in Figure 4 the bearing 60 being pivotally connected with the bar 57 and the bearing 61 being pivotally connected with the bar 58. When the platform is in its lowermost position the bars 57 and 58 as shown in Figure 7 are substantially adjacent to each other. When however, the arms are horizontal or substantially so, as shown in Figure 4, the bars 57 and 58 are widely spaced thereby forming a truss. The leveling means on each side of the platform gives the same sidewise stability and leveling and prevents rolling and also gives fore and aft leveling or stability so that any excess weight at one end of the platform is transmitted to the far end or to the other end thereof. When the arms extend vertically downward or vertically upward at the extreme limits of the movement of the platform, the truss construction supplied by the spaced connecting bars 57 and 58 is not needed, although some truss effect is achieved.

Figure 3:
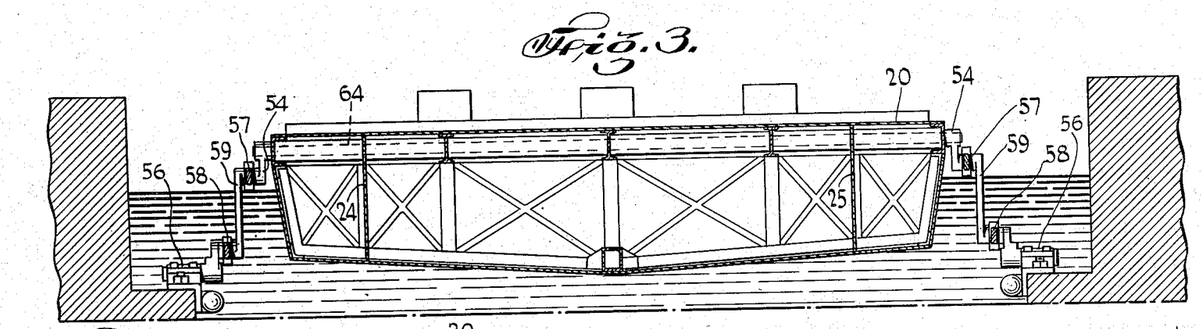
Figure 3 is a cross section through the dry dock taken on line 3—3 of Figure 1.

It is desirable to have the leveling and stabilizing means on each side of the platform interconnected. This may be accomplished by providing a shaft 64 extending across the platform and interconnecting with or carrying an arm on each side of the platform as shown in Figure 3. Since each arm on one side of the platform is interconnected with an arm on the other side the whole leveling means operates as a unit which renders the leveling means more effective. It is to be understood that this through shaft is not essential.

Means may be provided to prevent the arms from locking in dead center position. Any suitable means may be provided for this purpose that illustrating in Figure 9 including a spring 65 for each arm carried by a bracket 66 which engages its respective arm 54 when it is in vertical position and compresses the spring. The spring therefore propels the arm away from dead center position.

Figures 8, 9, 10:
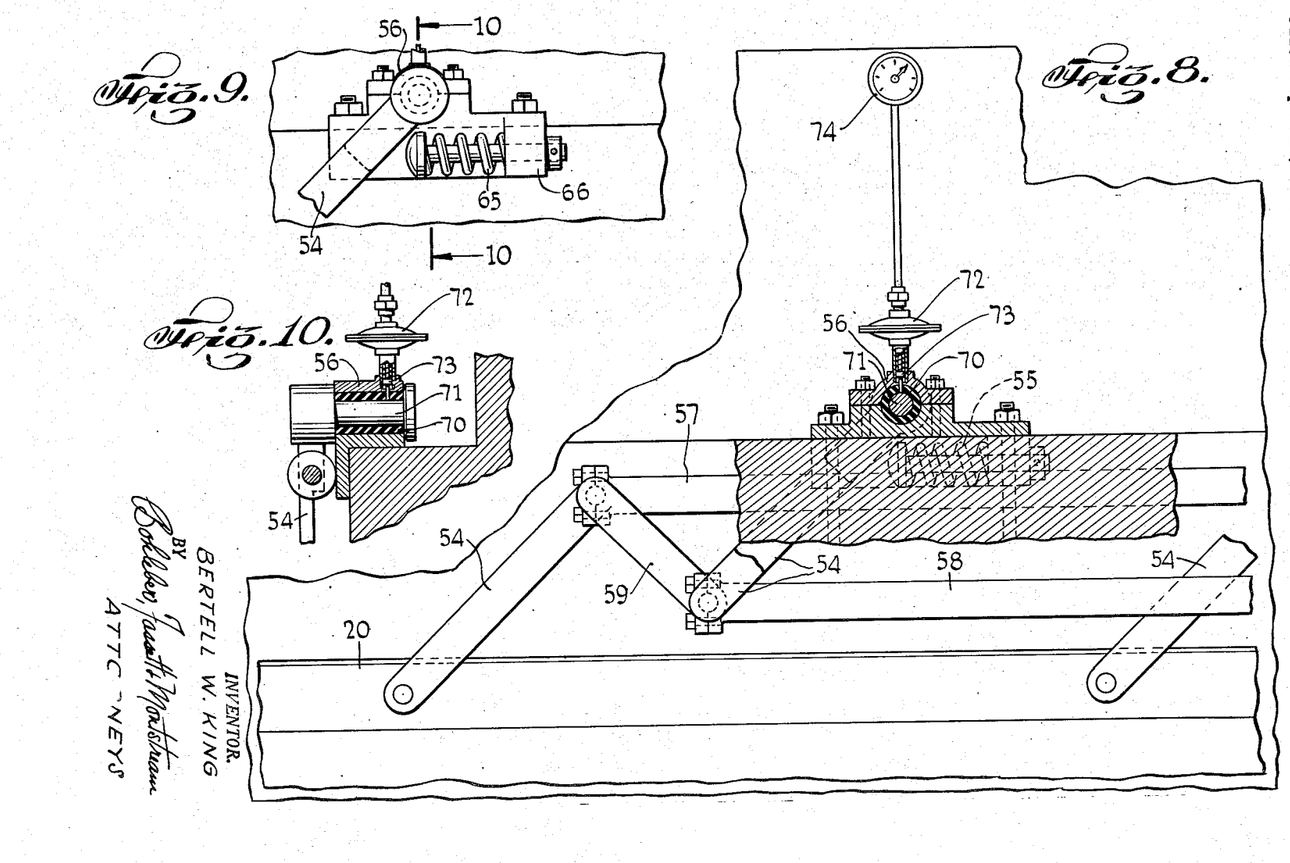
Figure 8 is a partial view of the leveling mechanism and a gage for indicating any unbalance in the dry dock and leveling means.
Figure 9 is a partial view of the means for impelling the leveling mechanism away from dead center position.
Figure 10 is a cross section taken on line 10—10 of Figure 9 through a yieldable bearing for the leveling means and a gage connected therewith.

Means may be provided to indicate any unbalance in the platform. Any suitable means may be used for this purpose that shown being a gage as shown in Figures 8 and 10. It may be that the engine room of a vessel is located in the stern of a vessel. This means that a greater portion of the weight of the vessel is carried by the aft portion of the platform which can be indicated by providing resilient bearings for the arm bearings 56 carried by the supporting side means 51. Any suitable resilient bearing may be utilized that illustrated including a rubber or resilient bushing 70 which receives a pivot 71 carried by the arm 54. A gage of any suitable construction may indicate any movement of the pivot 71 in the resilient bushing such as by means of a plunger 73 which contacts the pivot 71 and compresses a fluid diaphragm 72. The movement of the plunger may be transmitted to an indicator 74.

Normally when the vessel is uniformly balanced on the platform, the gages on the bearings 56 will indicate the same force or pressure or read zero. If, however, the greater part of the weight of the vessel is at the stern this will tend to lower the aft end of the platform and raise the forward end. The leveling and stabilizing mechanism opposes this action. However, the unbalanced weight tends to compress the underside of the resilient bushing 70 in aft bearings and will raise the pivots 71 in the forward bearings. This lifting of the pivot 71 will move the plunger 73 upwardly and a pressure reading will be shown on the indicator. When this occurs a greater amount of water may be expelled from the aft compartment to give it greater buoyancy until all gages indicate the same or give a zero reading.

Figure 17:
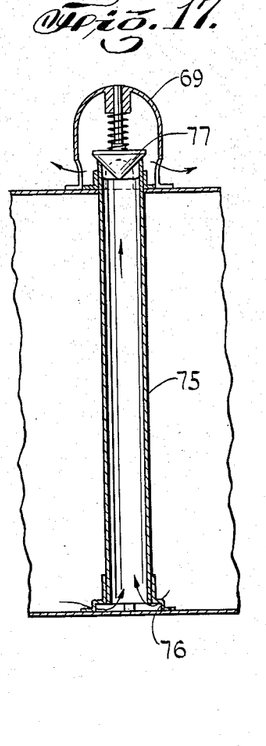
Figure 17 is a partial view in cross section of the floatable platform showing a stand pipe with a relief valve therefor.

The compartments may have a relief valve shown in Figure 17 which comprises a standpipe 75, the bottom of which is raised from the bottom by a bracket 76. A spring pressed relief valve 77 closes the top of the standpipe. A cover 69 may protect the valve and serve as an abutment for the spring which holds the valve normally closed. When the pressure within the compartment is too great compared with the external hydrostatic or atmospheric pressure, the valve is opened by the internal pressure to permit escape of air trapped therein until the pressure within the compartment approximates the desired internal pressure. This arrangement prevents building up of a pressure within the compartment above the designed maximum.

Figures 11, 12:
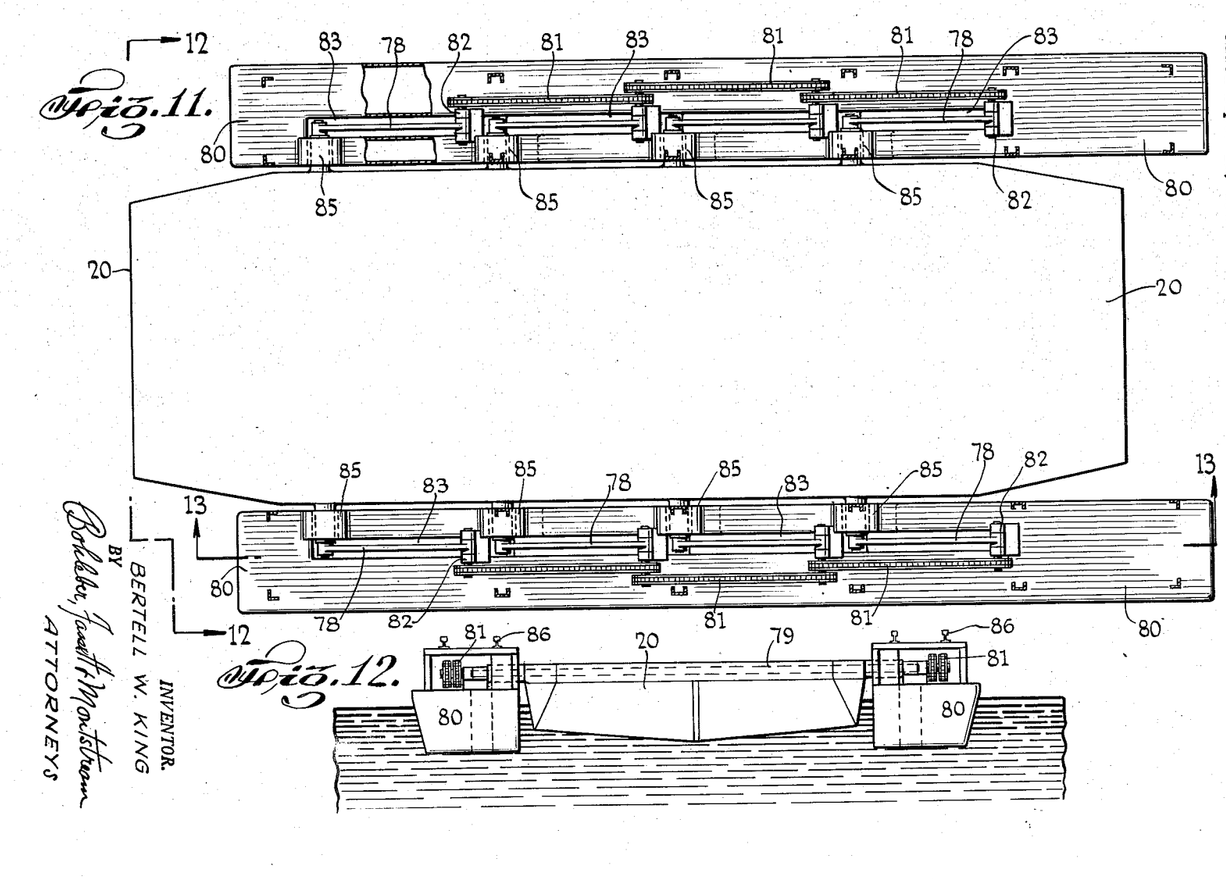
Figure 11 is a plan view of a dry dock in which the supporting side means are floating pontoons. This construction shows a different form of leveling mechanism.
Figure 12 is an end view of the dry dock of Figure 11 as viewed from lines 12—12 of that figure.
Figure 13:
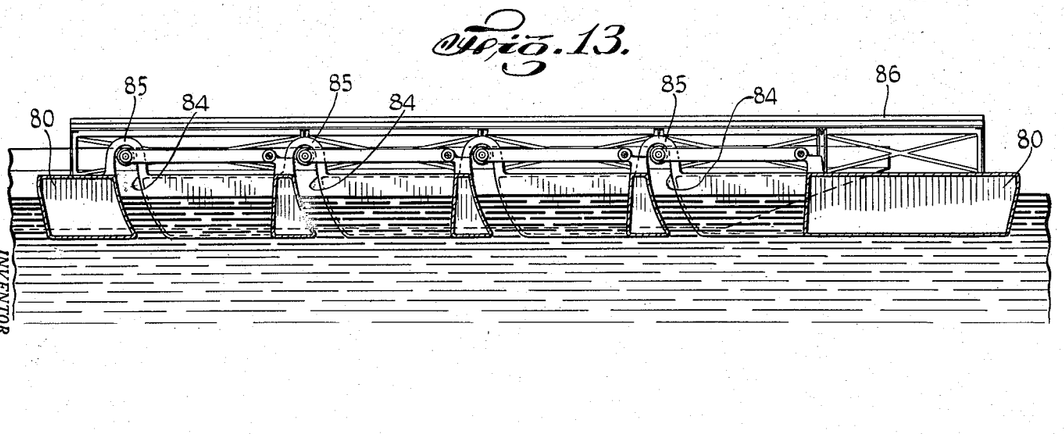
Figure 13 is a longitudinal section taken through one of the side supporting means or pontoons taken on line 13—13 of Figure 11.
Figure 14:
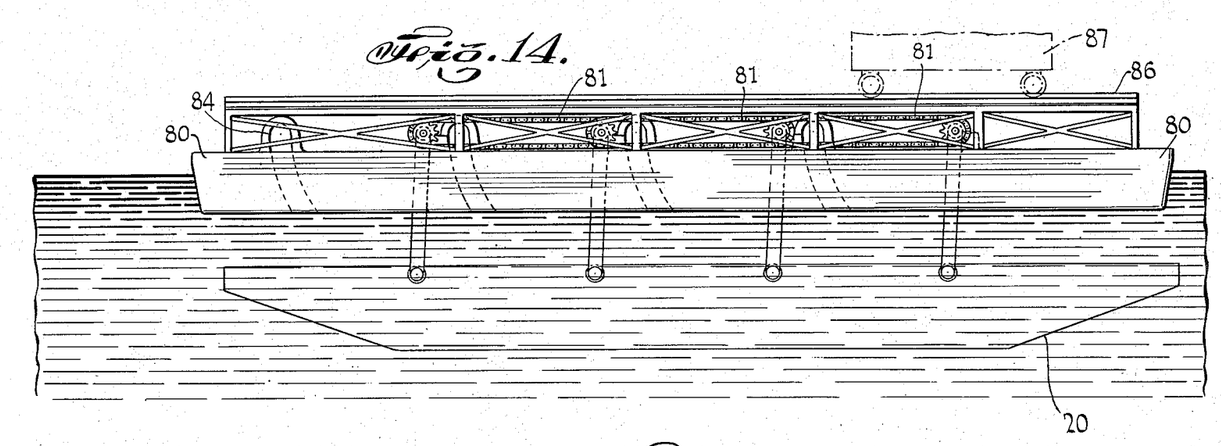
Figure 14 is a side elevation of the dry dock shown in Figure 11 with the floatable platform indicated in lowered position with dashed lines.

The floatable platform 20 may be utilized with floating supporting side means as shown in Figures 11 and 12 rather than with a fixed structure as shown in Figure 1. The floatable platform 20 has a leveling and stabilizing means which may be like that described above, however, the means illustrated differs somewhat from that shown in Figure 1. The leveling means of Figures 11 and 12 includes arms 78 which are pivotally mounted to the hull. Preferably a through shaft 79 extends the width of the platform and carries or is secured to an arm on each side of the platform so that the leveling means upon each side of the platform is connected together. The other end of each arm 78 is pivotally carried by the supporting side means which is a pontoon or floating structure 80 upon each side of the lifting platform. The arms are connected together to operate in unison, the means shown being chains 81 mounted upon sprockets carried by the respective arm pivots.

It is desirable that the leveling and stabilizing means exert their pressure centrally of the pontoons. It is for this reason that the arm bearings 82 are located centrally of the pontoon. The arms therefore swing in a passage way 83 provided in the pontoon and the end of the through shaft 79 moves through a passage way 84 which may be arcuate. A bridge 85 may connect or anchor the free end of the hanging portion of the pontoon to its adjacent portion of the pontoon. The pontoon may carry rails 86 for a crane 87. The dry dock illustrated in Figures 11 through 14 is a floating dry dock in that it can be moved wherever it may be needed. The resilient bearings with gages to indicate unbalance of the platform may be utilized with this construction if desired.

Figure 18:
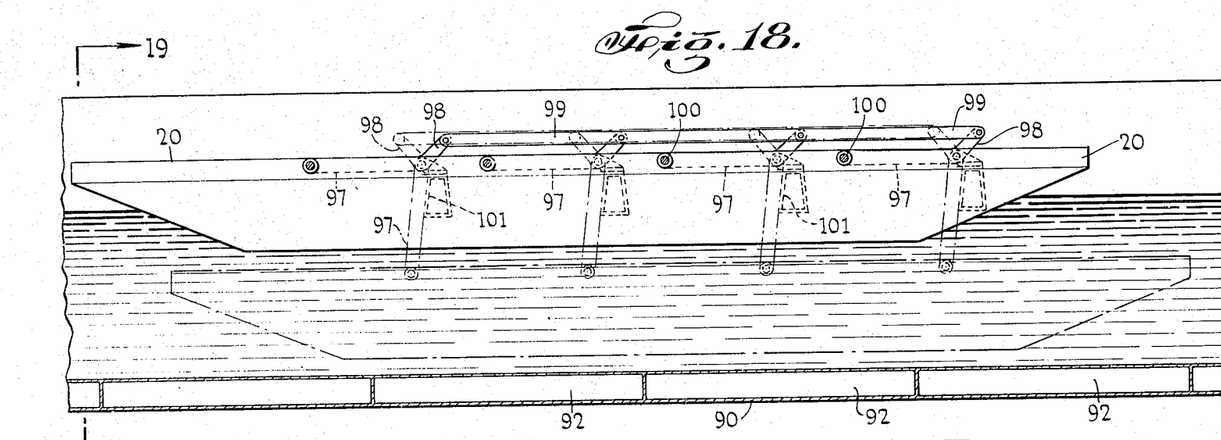
Figure 18 is a side elevation of a dry dock utilizing a floating hull with upstanding sides between which is carried a floatable platform with leveling mechanism. The lowered position of the floatable platform is shown in dot and dash lines.
Figure 19:
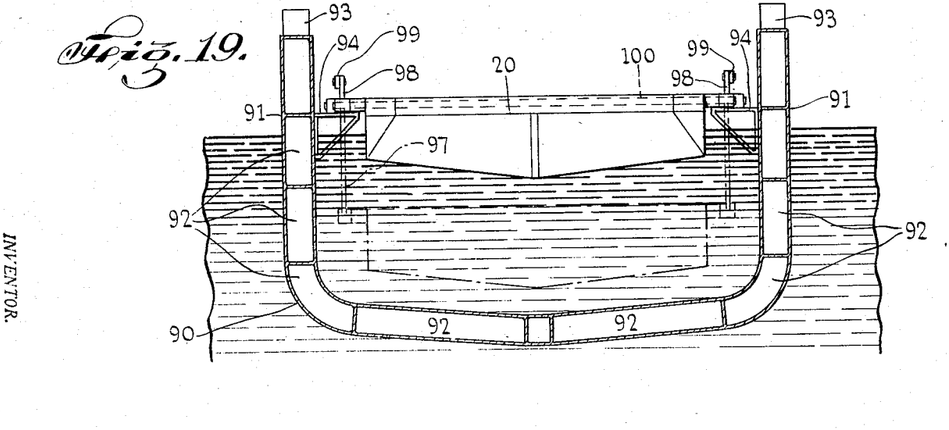
Figure 19 is a cross section taken on line 19—19 of Figure 18.

The floatable platform 20 may be used with a floating hull 90 shown in Figures 18 and 19. The hull has upstanding supporting side means 91 between which the floatable platform 20 is located. The hull may have compartments 92 which may be flooded to lower the level of the hull or the water blown out to raise the level. The compartments may be flooded and pumped out by suitably pumping means 93 which may be carried by the hull. The hull may carry a ledge 94 on the inner side of each supporting side means 91. The leveling means for the floatable platform 20 is mounted thereon.

The leveling means shown in Figures 18 and 19 include a plurality of arms 97 which are pivoted at one end to the floating platform and the other end is pivoted to the hull or particularly to a ledge 94. The arms may have an extension 98 to which a connecting means or bar 99 is pivotally connected so that the arms operate in unison. The stabilizing and leveling means also may have the arms on both sides of the hull connected together by means of a through shaft 100. A stop 101 may prevent the arms from going to dead center position. The operation of the leveling means is the same as that shown in the constructions described hereinbefore.

The floating dry dock in Figures 18 and 19 is portable in that it may be moved wherever it may be needed. This dry dock is particularly flexible and efficient in that the hull may be flooded and sunk to accommodate the draft of the vessel to be received upon the platform. In operation the platform is flooded and sunk to its lowest level with respect to the hull. The compartments of the hull may then be flooded to sink the platform to a level depending upon the draft of the vessel to be floated after which the floatable platform has the water pumped out of its compartments and the vessel is floated. Such a dry dock is particularly efficient in that it requires pumping only enough water to float the particular vessel to be dry docked. It also has all of the leveling and stabilizing characteristics of the previous described constructions.

This invention provides an improvement in a dry dock. It is understood that various modifications in structure, as well as changes in mode of operation, assembly, and manner of use, may and often do occur to those skilled in the art, especially after benefitting from the teachings of an invention. This disclosure illustrates the preferred means of embodying the invention in useful form.

What is claimed is:

1. A dry dock comprising a floatable platform, means to flood the platform, means to force the water from the platform, and means to maintain the platform level including a plurality of shafts rotatably mounted upon the platform and extending thereacross, an arm secured to each shaft upon each side of the platform, pivot means carried by each arm spaced from the shaft, and means connecting together the arms upon each side of the platform.

2. A dry dock comprising a floatable platform, means to flood the platform, means to force the water from the platform, means to maintain the platform level including a plurality of spaced arms upon each side of the platform, pivot means carried by each arm and mounted upon each side of the platform, a second pivot means carried by each arm spaced from the first pivot means, the arms having a dead center position, means connecting together the arms upon each side of the platform, and resilient means cooperating with the arms to propel the arms from dead center position.

3. A dry dock comprising a floatable platform, means to flood the platform, means to force the water from the platform; and means to maintain the platform level including a plurality of pairs of arm pivots one of each pair being carried by the platform at spaced points thereon and on each side of the platform, an arm mounted in each pair of pivots, means connecting together the arms upon each side of the platform, a resilient mounting for the pivot of at least two arms, and gage means connected with the pivots having a resilient mounting to indicate any unbalanced pressure upon the pivots.

4. A dry dock comprising a floatable platform having at least one separate compartment at each end, means to flood the compartments, means to force the water from each compartment, means to maintain the platform level including a plurality of pairs of arm pivots one of each pair being carried by the platform at spaced points thereon and on each side of the platform, an arm mounted in each pair of pivots, means connecting together the arms upon each side of the platform, a resilient mounting for the pivot of at least two arms, and gage means for the pivots having a resilient mounting to indicate any unbalanced pressure upon the pivots.

5. A dry dock to be located between supporting side means, said dry dock comprising a floatable platform having at least one floodable compartment at each end, means to flood the floodable compartments, means to force the water from the compartments, means to maintain the platform level including a plurality of pairs of arm pivots one of each pair being carried by the platform at spaced points thereon and on each side of the platform, an arm mounted in each pair of pivots, means connecting together the arms upon each side of the platform, at least two spaced arm pivots each having a pivot bushing which yields under pressure, and gage means connected with the pivots having yieldable bushings to indicate any change in movement of the pivot in the bushing.

6. A dry dock to be located between supporting side means, said dry dock comprising a floatable platform, means to flood the platform, means to force the water from the platform, means to maintain the platform level including a plurality of arms pivotally mounted upon each side of the platform, a pair of connecting pivots carried by the arms on each side of the platform which pivots are spaced vertically from each other when the arm pivots are in horizontal position, and bars carried by the connecting pivots and connecting together the arms upon each side of the platform.

7. A dry dock to be located between supporting side means, said dry dock comprising a floatable platform, means to flood the platform, means to force the water from the platform, means to maintain the platform level including a plurality of pairs of arm pivot means upon each side of the platform one pair being carried by the platform, an arm for each pair of arm pivots having two end portions in spaced parallel relation and a connecting portion centrally of the arm, the end of each arm being connected to a pivot of each pair of arm pivots, a pair of connecting pivots carried by each arm one pivot being at each end of the connecting portion of each arm so that they are spaced vertically from each other when the arm pivots are in horizontal position, and bars carried by the connecting pivots and connecting together the arms upon each side of the platform.

8. A dry dock combination comprising a floating hull having floodable compartments and spaced sides, means to flood the hull compartments, a floatable platform, means to flood the platform, means to force the water from the hull and platform, means to maintain the platform level including a plurality of pairs of arm pivots upon each side of the platform, one of each pair of pivots being carried by the platform at spaced points and the other being carried by the hull, an arm mounted in each pair of pivots, and means connecting together the arms upon each side of the hull.

9. A dry dock combination comprising a floating hull having floodable compartments and spaced sides, means to flood the hull compartments, a ledge carried upon the inner wall of the spaced sides, a floatable platform, means to flood the platform, means to force the water from the hull and platform, means to maintain the platform level including a plurality of pairs of arm pivots upon each side of the platform, one of each pair of pivots being carried by the platform at spaced points and the other being carried by the ledge, an arm mounted in each pair of pivots, and means connecting together the arms upon each side of the platform.

10. A drydock to be located between supporting side means, said dry dock comprising a platform having floodable compartments, means to flood the platform, means to expel the water from the platform; means to maintain the platform level including a plurality of spaced arms upon each side of the platform, a first pivot for each arm pivotally mounting the arm to the platform, a second pivot on each arm spaced from the first pivot, a pair of connecting pivots carried by each of the arms on each side of the platform which connecting pivots are spaced vertically from each other when the arms are in sidewise extending position, the connecting pivots also being in spaced relation laterally, and bars carried by the connecting pivots and connecting together the arms upon each side of the platform whereby the arms may swing from a downwardly extending position to an upwardly extending position.

11. A drydock to be located between supporting side means, said dry dock comprising a platform having a plurality of separate compartments, at least one of the compartments having a volumetric capacity providing a buoyancy approximately the same as but less than the weight of the platform, means to flood the other compartments of the platform, means to expel the water from the compartments, means to maintain the platform level including a plurality of spaced arms upon each side of the platform, a first pivot for each arm pivotally mounting the arm to the platform, a second pivot on each arm spaced from the first pivot, connecting pivots carried by each of the arms on each side of the platform, and bars carried by the connecting pivots and connecting together the arms upon each side of the hull.

12. A drydock to be located between supporting side means, said dry dock comprising a platform having a plurality of separate compartments, at least one of the compartments having a volumetric capacity providing a buoyancy approximately the same as but less than the weight of the platform, means to flood the other compartments of the platform, means to expel the water from the compartments, means to maintain the platform level including a plurality of spaced arms upon each side of the platform, a first pivot for each arm pivotally mounting each arm to the platform, a second pivot on each arm spaced from the first pivot, and means connected with each of the arms on each side of the platform and connecting together the arms whereby the arms swing in unison.

13. A drydock comprising floatable supporting side means having central passageways, a platform having floodable compartments located between the supporting side means, means to flood the platform, means to expel the water from the platform; means to maintain the platform level including a plurality of arms pivotally mounted upon each side of the platform and having pivots mounted upon the supporting side means, the arm pivots carried by the supporting side means being located approximately centrally of the supporting side means with the arms swinging in the central passageways, and means connecting together the arms upon each side of the platform.

14. A drydock to be located between supporting side means, said dry dock comprising a platform having floodable compartments, means to flood the platform, means to expel the water from the platform; means to maintain the platform level including a plurality of spaced arms upon each side of the platform, a first pivot for each arm pivotally mounting the arm to the platform, a second pivot on each arm spaced from the first pivot, an extension carried by each of the arms on each side of the platform and having a connecting pivot, and a bar carried by the connecting pivot of each arm and connecting together the arms upon each side of the platform.

15. A drydock to be located between supporting side means, said dry dock comprising a platform having floodable compartments, means to flood the platform, means to expel the water from the platform; means to maintain the platform level including a plurality of spaced parallel arms upon each side of the platform, a first pivot for each arm pivotally mounting the arm to the platform, a second pivot on each arm spaced from the first pivot, a pair of connecting pivots carried by each of the arms on each side of the platform which pivots are spaced in vertical relation from each other when the arms are in side wise extending position, a bar carried by corresponding connecting pivots upon each arm on each side of the platform and connecting together the arms upon each side of the platform whereby the arms may swing together, and means connecting at least one arm upon one side with an arm upon the other side of the platform for operation of the arms upon both sides in unison.

16. A drydock to be located between supporting side means, said dry dock comprising a platform having floodable compartments, means to flood the platform, means to expel the water from the platform; means to maintain the platform level including a plurality of spaced parallel arms upon each side of the platform, a first pivot for each arm pivotally mounting the arm to the platform, a second pivot on each arm spaced from the first pivot, a pair of connecting pivots carried by each of the arms on each side of the platform which pivots are spaced in vertical relation from each other when the arms are in sidewise extending position, a bar carried by each corresponding connecting pivot upon each arm on each side of platform and connecting together the arms upon each side of the platform, and a shaft extending across the platform and secured to an arm upon opposite sides of the platform to swing the arms upon both sides thereof in unison.

BERTELL W. KING.

(References on following page)

REFERENCES CITED

The following references are of record in the file of this patent:

UNITED STATES PATENTS

| Number | Name | Date |
|---|---|---|
| 123,402 | Janicki | Feb. 6, 1872 |
| 153,729 | Soulerin | Aug. 4, 1874 |
| 1,296,662 | Hohorst | Mar. 11, 1919 |
| 1,487,742 | Hill | Mar. 25, 1924 |
| 2,291,077 | Harris | July 28, 1942 |

FOREIGN PATENTS

| Number | Country | Date |
|---|---|---|
| 11,131 | Great Britain | June 8, 1894 |